Figure 1:
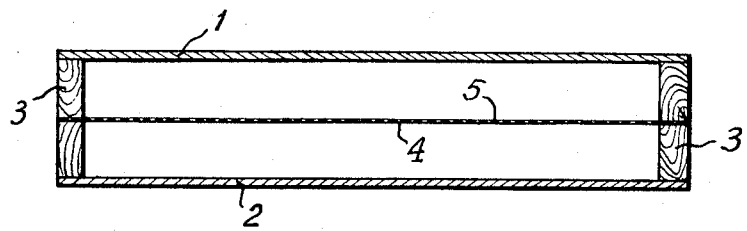

April 26, 1966

J. PONCET 3,247,928

SOUND-INSULATING PARTITION WITH POROUS
DEPOSIT OF AGGLOMERATED PARTICLES
Filed March 25, 1964

INVENTOR
Jean Poncet
By Holcombe, Wasserville Bristow
ATTORNEYS 3,247,928
SOUND-INSULATING PARTITION WITH POROUS
DEPOSIT OF AGGLOMERATED PARTICLES
Jean Poncet, 112 Blvd. Brune, Paris 14, France
Filed Mar. 25, 1964, Ser. No. 354,630
Claims priority, application France, Apr. 1, 1963, 929,923
19 Claims. (Cl. 181—33)

Numerous types of sound-insulating partitions are already known which are constituted of rigid walls at a distance from each other, between which are agglomerated sound-insulating padding materials such as stuffing of long glass fibres, cork scraps, cellular materials or any other similar materials.

It has however been found that the thickness of these partitions could not be reduced below a minimum value without producing considerable deterioration of the sound-insulating effect. Furthermore, partitions of the type already produced are generally fixed partitions since it seems difficult suitably to secure the sound-proofing material to movable folding partitions.

The present invention has for an object to improve the sound-proofing of partitions serving to limit a location or to separate two locations, by remedying the disadvantages above described.

A partition according to the invention comprises two external walls located at a distance from each other, and a third wall located within the space comprised between the two external walls and constituted by a support in the form of a panel or a sheet, one at least of the surfaces of which is covered with a deposit of a porous structure obtained by the spraying or like projection of particles.

The deposit of porous structure is preferably a metal deposited by a metallization process. The technique of metallization by spraying a metal on to a support is well-known, but the invention extends to the locating between the two walls of a partition of at least one supporting wall covered with a deposit which is preferably of metal, obtained by spraying particularly lead or aluminium but other materials also may be used. In the case where the metallized layer obtained by projection is lead, the thickness of this layer is between $\frac{2}{10}$ and $\frac{1}{20}$ of an mm. and preferably approx. $\frac{1}{10}$ of an mm. In the case where the metallized layer sprayed is of aluminium, the thickness is between $\frac{1}{10}$ and $\frac{1}{40}$ of an mm. and preferably about $\frac{1}{20}$ of an mm.

The invention may be applied both to fixed and to movable partitions. In the first case, at least the external walls are preferably secured. In the second case, the external walls and the intermediate walls are flexible and capable of being folded into pleats. In every case the invention allows for the production of fixed or movable partitions of a relatively slight thickness which nonetheless ensure effective sound-insulation.

The intermediate wall may be composed of a panel or a thin sheet such as sheet of paper or plastic material having preferably a rough surface in order to facilitate adhesion of the metallized coating. Advantageous use may also be made of a panel or sheet which is more or less thick and of cellular material which itself possesses sound-proofing properties.

The intermediate wall may also comprise a sound-proofing element constituted of a panel of cellular plastics material, at least one surface of which is covered with a deposit of porous structure obtained by the spraying or other projection of particles which adhere to the surface of said panel, said deposit being preferably of metal and obtained by means of metallization.

Figure 2:
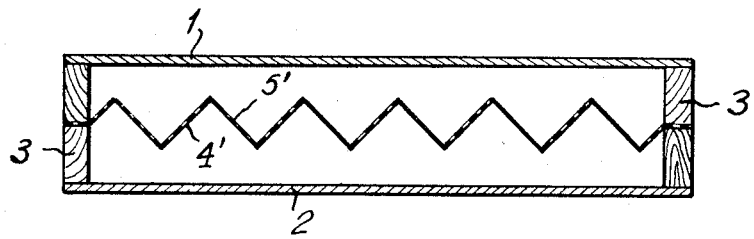
Figure 3:
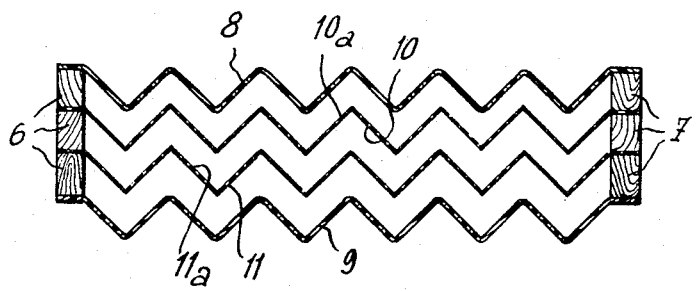
Figure 4:
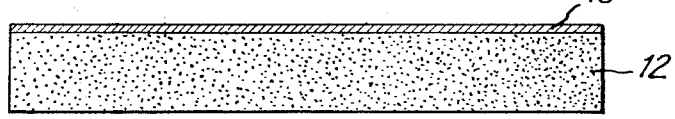

In order that the invention may be better understood, reference will now be made to the accompanying drawings which show some embodiments thereof by way of example, and in which:

FIGURE 1 and FIGURE 2 are sections of fixed partitions according to the invention, FIGURE 3 is a section of a movable folding partition according to the invention, and FIGURE 4 is a section of an intermediate wall or partition element for use in a partition according to the invention.

Referring first to FIGURES 1 and 2, fixed partitions are shown in which the side walls 1 and 2 are constituted for example by sheets of plywood or a like material. The sheets are secured to a support shown diagrammatically at 3, by any convenient means, for example gluing or cementing.

In the embodiment shown in FIGURE 1, a sheet 4 of paper or other material is fixed by its periphery to the support 3 in such a manner as to be stretched between the two walls 1 and 2. The sheet of paper 4 for example is metallized on at least one side by the deposit indicated at 5 which is preferably of lead or of aluminium as mentioned above. The securing of the sheet 4 to the support 3 is effected by means of joints of any convenient known type which ensure correct holding of the insulation element.

The metallized sheet of paper inserted between the two walls 1 and 2 acts as trap or baffle for sound waves, considerably damping their transmission from one side of the partition to the other.

Tests have been carried out for frequencies between 1000 and 2000 c./s. which come within the range of audible frequencies. The transmission apparatus was located in a room provided with an aperture opposite which was located a microphone. The intensity of sound transmitted to the microphone when no wall was provided on the aperture was about 53 decibels. If a sheet of paper 4 metallized with lead in the manner described above was interposed, the intensity transmitted was only about 1 decibel, while if aluminium was used the result was 5 decibels.

The effectiveness of sound-absorption of a partition of this type in the frequency zone indicated has not yet been perfectly explained. It seems however that it is due on the one hand to the porous structure of the metallized coating, to its high inertia and to its slight elasticity which prevent it from vibrating, and on the other hand to the difference in thickness between the coating and its support which effects a kind of braking of the vibratory energy which diminishes transmission of the sound waves. The two layers of air located on either side of the intermediate wall also cause sound absorption.

The effectiveness of the sound-insulation may be further increased by various ancillary means. It is for example possible to pleat the sheet 4′ metallized at 5′ on at least one of the faces, as shown in FIGURE 2. It is also possible to utilize as an intermediate wall 4 a channel or a sheet of cellular material which already itself possesses sound-insulation properties. It is also possible to metallize the intermediate wall 4 with lead on one surface and aluminium on the other surface.

In the same way, without departing from the scope of the invention, it possible to insert between the two walls 1 and 2 of the partitions several intermediate metallized walls 4 or 4′ parallel to one another.

The invention is similarly advantageously used in the case of movable folding partitions as used at present to separate two living rooms. FIGURE 3 shows a section of a movable partition of this type comprising a fixed support 6 and a movable support 7 suspended from an upper sliding bar (not shown) which may also slide in a groove provided on the floor. On the two support elements 6 and 7 are fixed two flexible walls, for example of plastics fabric, indicated at 8 and 9. These walls are capable of being folded into pleats and are similarly preferably suspended from the upper sliding bar or from a hinged device of the pantograph type or the like.

In the space located between the two walls 8 and 9 are arranged two sheets 10 and 11 coated on at least one of their surfaces with a deposit indicated at 10a and 11a. As already mentioned this deposit is preferably of metal, for example lead or aluminium, but may similarly be of any material capable of being deposited by spraying or like projection. Its thickness is of the order of that hereinbefore indicated.

The sheets of paper 10 and 11 are similarly pleated in such a manner as to correspond to the folds of the walls 8 and 9. They are furthermore secured to the supporting elements 6 and 7 by any suitable connecting means, as well as to the upper sliding bar from which the walls 8 and 9 are suspended although not illustrated. It is of course possible if desired to place between the walls 8 and 9 one or more sheets which have been metallized by spraying or other projection means.

FIGURE 4 shows an intermediate wall or partition element which can serve for the construction of sound-insulating partitions of the type described when referring to FIGURES 1 and 2, or of another type. This partition element comprises a rigid panel of cellular material 12 coated on one of its surfaces or on both surfaces with a deposit 13 of porous structure such as those obtained by atomization of solid or semi-solid particles agglomerating together, preferably of metal particles deposited by metallization. The rigid panel 12 may in particular be of cellular polyvinyl chloride of relatively high density, i.e. approximately 50 kg. per cu. m., having relatively large size cells.

A cellular panel of this type may be used with its normal skin coating but it is preferable to skim off this external skin in order to obtain rough surfaces with marked cell structure before applying the metallized deposit 13 on to said surfaces. It is known that these panels of cellular plastics material have good sound-proofing properties. The absorption effect is further increased by the metallized coating applied to said panel.

I claim:
1. A sound-insulating partition, comprising two external walls spaced from each other and at least one intermediate wall located in the space comprised between said two external walls and constituted by a support in the form of a panel or a sheet having at least one of its surfaces covered with a deposit comprising agglomerated particles of a fusible substance, said deposit being of porous structure.

2. A partition as claimed in claim 1, wherein said substance comprises a metal.

3. A partition as claimed in claim 2, wherein said metal is lead.

4. A partition as claimed in claim 3, wherein the thickness of the layer of lead is between $2/10$ mm. and $1/20$ mm.

5. A partition as claimed in claim 4, wherein the thickness of the layer of lead is approximately $1/10$ mm.

6. A partition as claimed in claim 2, wherein said metal is aluminium.

7. A partition as claimed in claim 6 wherein the thickness of the aluminium layer is between $1/10$ mm. and $1/40$ mm.

8. A partition as claimed in claim 7 wherein the thickness of the aluminium layer is approximately $1/20$ mm.

9. A partition as claimed in claim 1, wherein the intermediate wall is constituted by a thin sheet of rough-surfaced material.

10. A partition as claimed in claim 9, wherein the material consists of paper.

11. A partition as claimed in claim 9, wherein the material consists of a plastics material.

12. A partition as claimed in claim 1, wherein at least two intermediate walls are provided.

13. A partition as claimed in claim 1, wherein the intermediate wall is constituted by a panel or sheet of a cellular material.

14. A partition as claimed in claim 2, wherein the intermediate wall is coated with lead on one surface and aluminium on the other surface.

15. A partition as claimed in claim 1, comprising two rigid external walls fixed in spaced positions on a support, the intermediate wall being secured by its periphery to said support.

16. A partition as claimed in claim 1, comprising two flexible external walls and at least one intermediate flexible wall capable of folding with pleats.

17. A partition as claimed in claim 16, wherein the external walls also are capable of being folded into pleats.

18. A partition as claimed in claim 1 including an element comprising a panel of cellular plastics material having at least one surface covered with a said deposit being of porous structure.

19. A partition as claimed in claim 18, wherein said substance is a metal.

References Cited by the Examiner

UNITED STATES PATENTS

| | | | |
|---|---|---|---|
| 2,057,071 | 10/1936 | Stranahan | 181—33.1 |
| 2,098,138 | 11/1937 | Finck | 181—33.1 |
| 2,116,270 | 5/1938 | Le Grand | 181—33.1 |
| 2,125,286 | 8/1938 | Fletcher | 181—33.1 |
| 2,179,057 | 11/1939 | Schuetz | 181—33.1 |
| 2,221,309 | 11/1940 | Gazelle | 181—33.1 |
| 3,041,219 | 6/1962 | Steck | 181—33.1 |
| 3,126,049 | 3/1964 | Hollands | 181—33.1 |
| 3,149,693 | 9/1964 | Keller et al. | 181—33.1 |

FOREIGN PATENTS

| | | |
|---|---|---|
| 1,220,354 | 1/1960 | France. |
| 1,242,586 | 8/1960 | France. |
| 462,129 | 3/1937 | Great Britain. |
| 529,697 | 11/1940 | Great Britain. |
| 564,424 | 6/1957 | Italy. |

OTHER REFERENCES

Architectural Forum, periodical, issue of October 1959, page 63.

LEO SMILOW, *Primary Examiner.*